W. P. DUN LANY.
MOTOR FOR TALKING MACHINES.
APPLICATION FILED SEPT. 29, 1916.
1,284,072.
Patented Nov. 5, 1918.
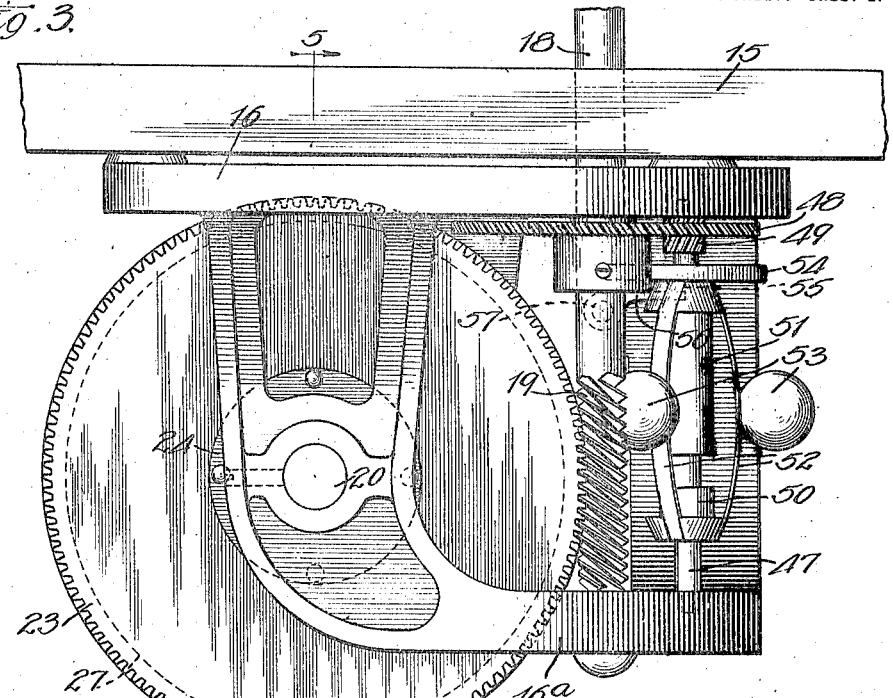
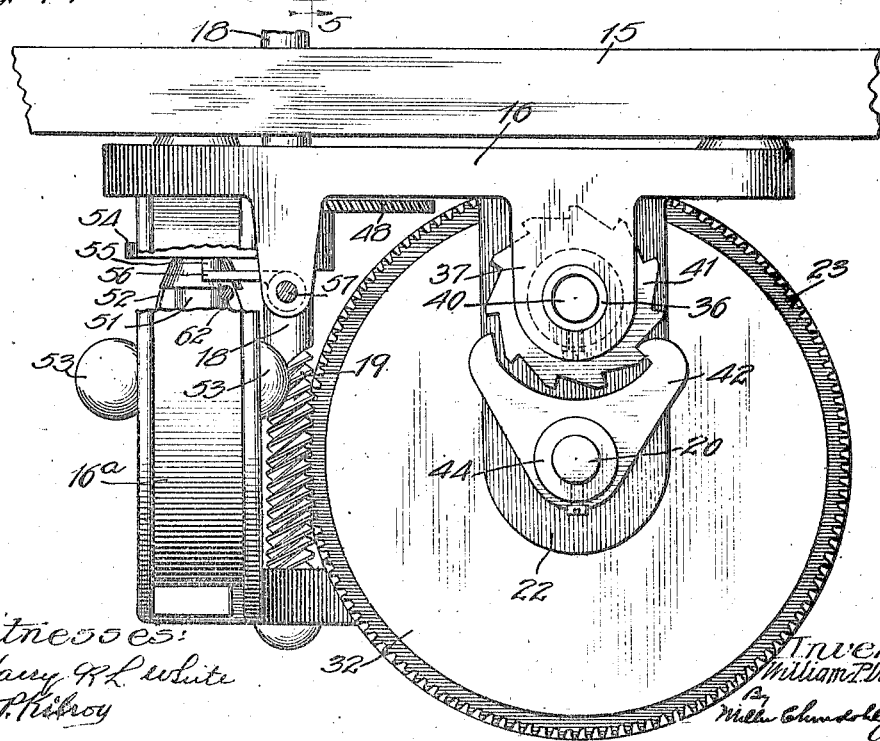

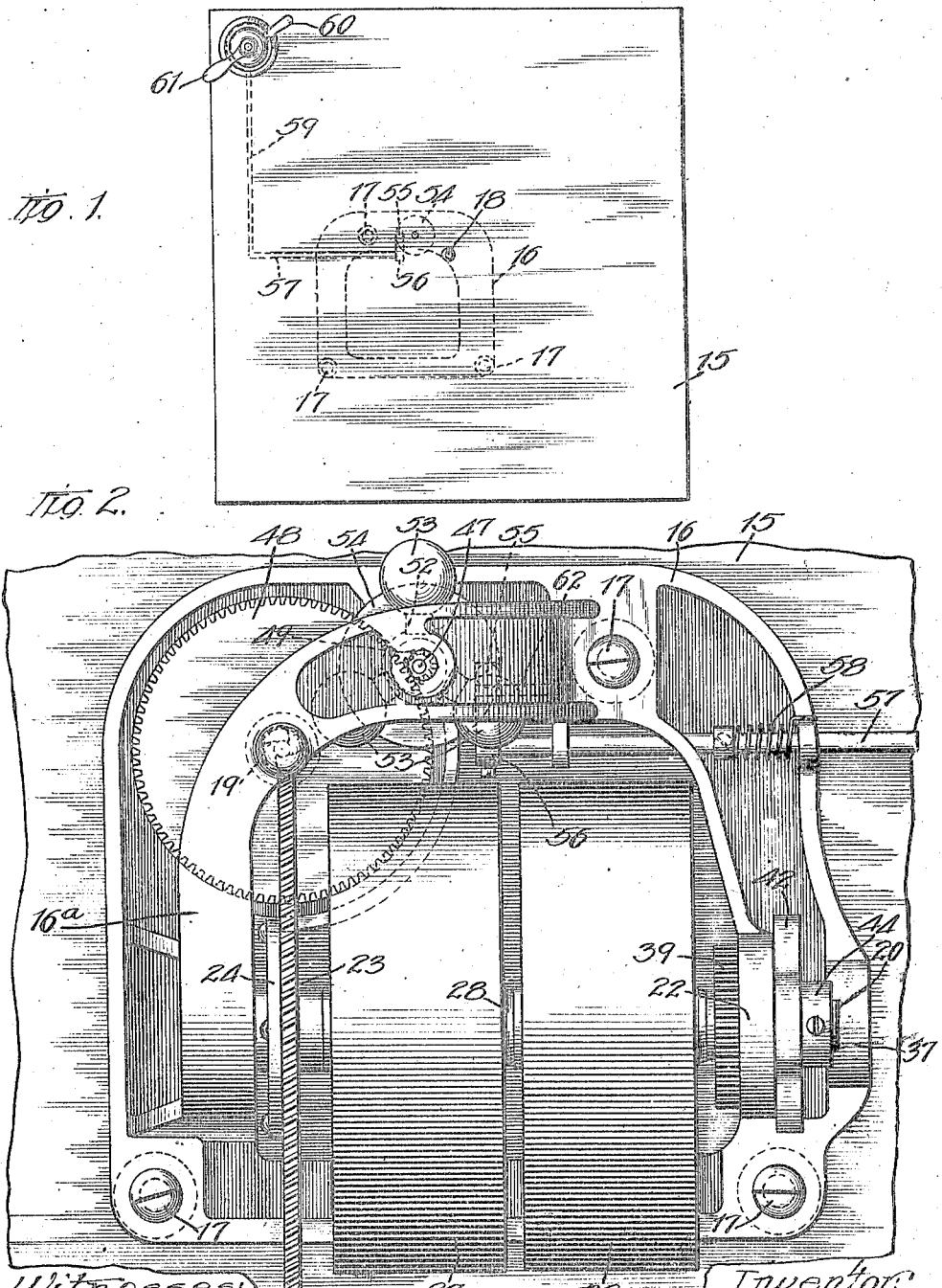

W. P. DUN LANY.
MOTOR FOR TALKING MACHINES.
APPLICATION FILED SEPT. 29, 1916.
1,284,072.
Patented Nov. 5, 1918.
4 SHEETS—SHEET 3.
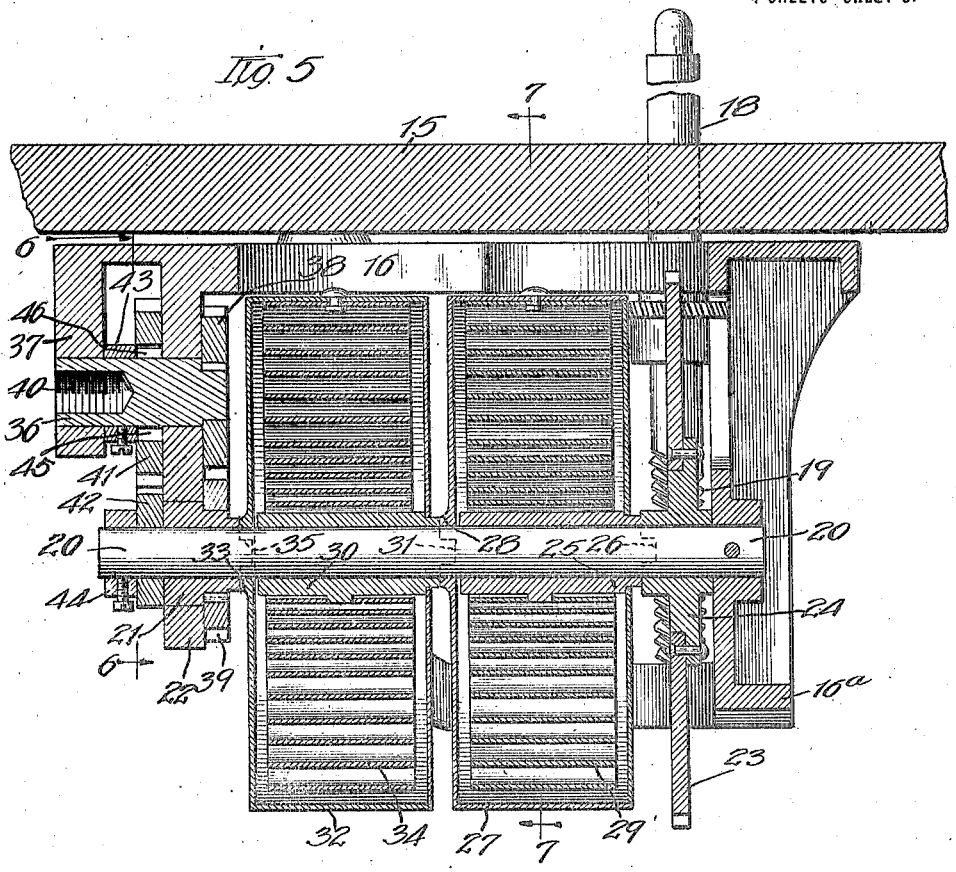
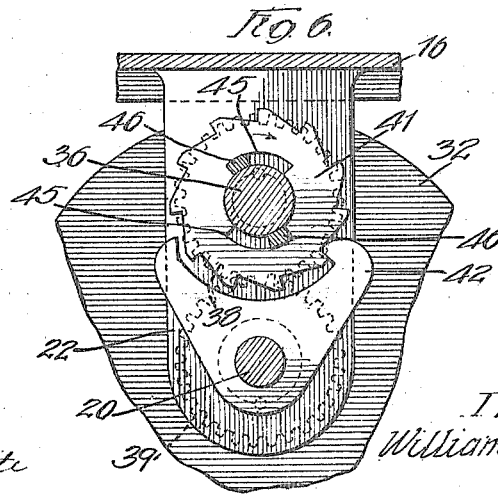
Witnesses:
Harry R. L. White
W. T. Kilroy
Inventor:
William P. Dun Lany.
By Miller Chindahl Parker
Attys W. P. DUN LANY.
MOTOR FOR TALKING MACHINES.
APPLICATION FILED SEPT. 29, 1916.
1,284,072.
Patented Nov. 5, 1918.
4 SHEETS—SHEET 4.
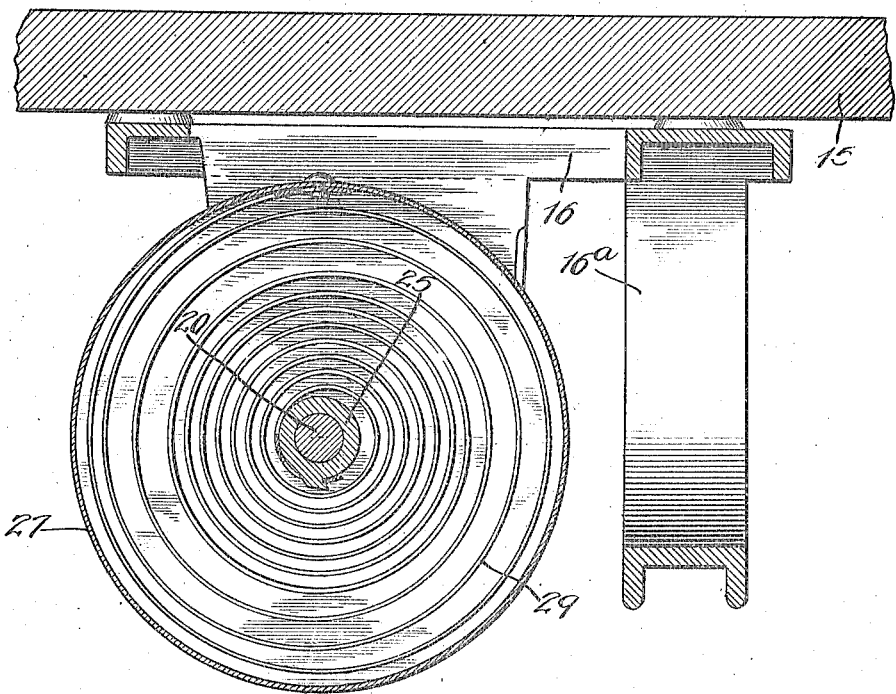
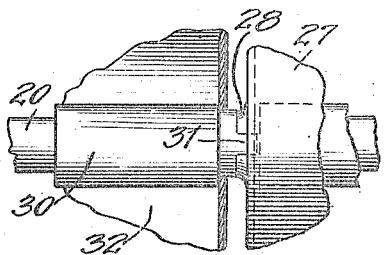 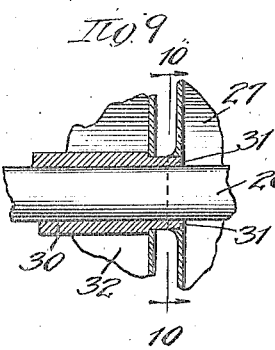
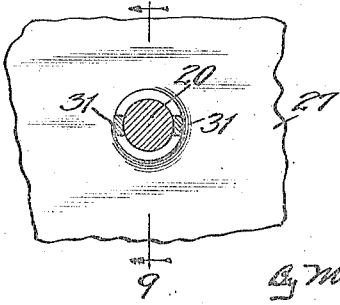
Witnesses:
Harry W. White
W. P. Kilroy
Inventor:
William P. Dun Lany
By Miller Chindahl Parker
Attys

UNITED STATES PATENT OFFICE.

WILLIAM P. DUN LANY, OF CHICAGO, ILLINOIS, ASSIGNOR TO SEARS, ROEBUCK AND COMPANY, OF CHICAGO, ILLINOIS, A CORPORATION OF NEW YORK.

MOTOR FOR TALKING-MACHINES.

1,284,072.  Specification of Letters Patent.  Patented Nov. 5, 1918.

Application filed September 29, 1916. Serial No. 122,797.

*To all whom it may concern:*

Be it known that I, WILLIAM P. DUN LANY, a citizen of the United States, residing at Chicago, in the county of Cook and State of Illinois, have invented certain new and useful Improvements in Motors for Talking-Machines, of which the following is a specification.

One of the objects of this invention is to produce an improved spring motor of very simple and durable construction in which all of the running parts are so constructed and standardized that they may be used either in a motor embodying a single spring drum or one embodying a plurality of drums, and in which duplicate parts may be employed in building up a plural-drum motor, it being only necessary to provide different sizes of the supporting frame for the different sizes of motor.

Another object of the invention is to provide improved winding means and improved means for preventing reverse movement of the winding elements.

A further object is to provide an improved frame and improved relation of the parts thereto, so as to produce a simple, strong and compact motor.

In the accompanying drawings, Figure 1 is a plan view of the removable board in a cabinet talking machine, upon which board the motor and regulating means is mounted, the motor being indicated in dotted lines. Fig. 2 is a bottom plan view of a motor embodying my invention. Fig. 3 is an elevation looking at the left-hand end of Fig. 2. Fig. 4 is an elevation looking at the end opposite to that shown in Fig. 3. Fig. 5 is a section along the axis of the spring motor shaft as indicated by the line 5—5 of Fig. 3. Fig. 6 is a sectional detail view of the means for preventing reverse rotation of the winding means, the view being taken in the plane of line 6—6 of Fig. 5. Fig. 7 is a sectional view in the plane of line 7—7 of Fig. 5. Figs. 8, 9 and 10 are fragmental sectional detail views illustrating the connection between the units of the spring motor proper, Fig. 9 being a section on line 9—9 of Fig. 10 and Fig. 10 being taken in the plane of line 10—10 of Fig. 9.

For the purpose of disclosing my invention, I have chosen to illustrate a motor comprising two spring-driving units, but it should be understood that the invention may be embodied in a motor comprising a single unit or any other desired number. Various other modifications may be made, and while the following description will cover the present embodiment in detail, it should be understood that no undue limitation is intended. The scope of the invention will be pointed out in the appended claims.

Referring to Fig. 1, 15 indicates the removable board which is embodied as a part of the cabinet in one style of talking machine. The motor and its controlling means are mounted on this board, the motor being attached to the under-face of the board, and the manually operable controlling levers of the regulating means being mounted above the upper face of the board.

The main frame of the motor is indicated by the reference numeral 16 and preferably consists of a single integral metallic casting having a horizontal portion to lie along the lower face of the board 15, being secured to the latter by screws 17, and having a depending portion $16^a$ of irregular U-shape. One arm of this U provides a bearing for one end of the spring motor shaft, the other arm being located at one side of said shaft. The base of the U is curved and provides bearings for the turn-table spindle and the governor shaft. By forming the parts of the frame of a single casting, the machining necessary to finish the same is reduced to a minimum; the time required to assemble a multiplicity of the parts of the frame is eliminated; and maximum rigidity is attained.

The rotary spindle 18, upon the upper end of which is secured the turn-table (not shown) for the record, is mounted in suitable bearings in the horizontal portion of the frame and in the cross-piece of the U-shaped portion. The lower portion of said spindle is provided with a worm 19. The parts of the spring-driving means are mounted upon a horizontal shaft 20 (Fig. 5) which is non-rotatably mounted in the frame in any suitable manner. In the present instance, one end of said shaft is fixed (as by means of a set screw) in one arm of the depending U-shaped portion $16^a$ of the frame, while the opposed end of the shaft is supported in a bushing 21 which is rotatably mounted in a depending lug 22 of the frame, said bushing constituting one element of the winding means, as will be later described.

On the shaft 20 is rotatably mounted a gear wheel 23 which in the present instance has inclined teeth and meshes with the worm 19 on the turn-table spindle 18. This gear wheel preferably, though not necessarily, comprises an annular body portion rigidly secured to a separate hub portion 24. Alongside the gear wheel is a spring-driving device or unit which comprises a sleeve 25 rotatably mounted on the shaft 20 said sleeve being directly connected to the hub 24, to rotate the gear wheel through the medium of interlocking parts which, in the present instance, are in the form of opposed lugs 26 on one end of the sleeve fitting into recesses in said hub. A drum 27 surrounds the sleeve 25 and comprises a peripherally flanged side wall having a central bearing 28 (Fig. 8) fitting upon the shaft 20, and a plate having a central opening fitting upon the sleeve 25 and constituting the other side wall of the drum. Within this drum is a spirally-coiled spring 29 having its ends attached respectively to the peripheral flange of the drum and the central sleeve 25.

The exemplary form of motor herein shown comprises two spring-driving units, a second sleeve 30 being rotatably mounted on the shaft 20 and being arranged to rotate the drum 27 through the medium of interlocking parts, comprising a pair of opposed lugs 31 (Fig. 8) on the sleeve fitting into recesses on the bearing portion of the drum. A second drum 32 surrounds the second sleeve 30 and has a bearing portion 33 fitting upon the shaft 20. A spirally-coiled spring 34 has its ends attached respectively to the drum 32 and the second sleeve 30.

The bushing 21 previously mentioned has a driving engagement with the second drum 32 by suitable means such as a pair of lugs 35 (Fig. 5) on the bushing entering recesses in the central bearing 33 of the drum. If only a single set of spring devices is to be used, the bushing directly engages the single drum as will be understood. Any desired number of units (each comprising a drum, spring and sleeve) may be mounted upon a horizontal supporting shaft of proper length to provide a motor of greater or less capacity. The elements of the respective units are duplicates of each other, so that any element is adapted for use either in a single-unit or a plural-unit motor. In assembling the parts, the elements of each unit may be first associated; the gear 23, the unit or units, and the bushing 21 may then be quickly slipped onto the supporting shaft 20 in succession, the driving relation of the parts being effected merely by the interengagement of the lugs on one part with the recesses on an adjacent part. The shaft with the devices mounted thereon may then be rigidly fixed in position in the supporting frame. The running parts for a single-unit motor are identical with those of a plural-unit motor, except for the difference in the number of units so that the only element of the entire motor which it is necessary to make special for any one size of motor is the supporting frame.

This standardization of the parts taken with the special construction and relation which permits rapid assembling thereof, provides a motor which may be cheaply manufactured, and at the same time has many desirable characteristics in the way of durability, smooth running, and the like.

The bushing 21 is arranged to be driven to rotate the drums and wind up the springs by means of a winding shaft 36 (Fig. 5) which, in the present instance, is rotatably mounted in the lug 22 and in an additional depending lug 37 on the frame, one end of said shaft having fixed thereon a pinion 38 meshing with a pinion 39 fixed on the bushing 21. The other end of the winding shaft may have a threaded recess 40 therein to receive a winding crank.

In order to prevent reverse rotation of the drums and the elements of the winding means, I provide an improved device comprising a ratchet wheel 41, which is preferably mounted upon the winding shaft 36, and a coöperating double pawl 42 mounted to oscillate on the shaft 20. 43 and 44 designate collars for holding the ratchet wheel and the pawl in place. The ratchet wheel is provided with recesses 45 (Fig. 6) adjacent to its central portion, and the winding shaft 36 has projections 46 occupying said recesses but being of less width than the recesses, so that the ratchet may have a limited amount of lost motion or rotary play upon the shaft. The opposed ends of the pawl 42 are so positioned with respect to the distance between the teeth of the ratchet that when one pawl is in engagement with the tooth, the other is located about half-way between the two teeth and in the rotation of the ratchet wheel the teeth are arranged to alternately engage the ends of the pawl to permit passage of the teeth while at the same time insuring that one or the other end of the pawl will be in position to engage a tooth on the ratchet when the winding ceases. The lost motion mounting of the ratchet wheel is provided for the purpose of relieving a too tightly wound spring by allowing a slight amount of recoil of the winding elements, thus insuring a loosening up of the spring upon those occasions in which the operator thoughtlessly winds the spring up to the limit.

The speed of rotation of the turn-table spindle 18 may be regulated by suitable means, which in the present instance comprises a vertical governor shaft 47 (Fig. 3) disposed close to the spindle 18 and mounted in bearings in the horizontal portion and in the base of the U-shaped portion of the frame. The shaft 47 is driven from the spindle by intermeshing gears 48, 49. On this shaft is mounted a centrifugal governor device which may comprise a fixed collar 50 and a slidable sleeve 51, to which are attached the opposite ends of bowed leaf springs 52, each carrying a weight 53. A brake disk 54 is fixed to the sleeve 51 and is arranged to be contacted by a brake shoe 55 (Fig. 4) which is carried by an arm 56 fixed on one end of a horizontal rock shaft 57 mounted in the frame. A coiled torsion spring 58 (Fig. 2) tends to rotate the shaft in the direction to press the brake shoe against the disk 54 and stop the motor. The shaft is arranged to be rocked in the opposite direction to withdraw the brake shoe and allow the motor to start, and also to position the brake shoe to regulate the speed of the motor, by suitable means, which may comprise a radial arm 59 (see Fig. 1) and devices acting on said arm to control its position, said devices including a speed regulating lever 60 and a start-and-stop lever 61 mounted on the upper face of the board 15. A stop pin 62 is fixed in the frame-part 16ª, in position to engage the brake-arm 56 and limit the distance which it moves away from the brake disk.

I claim as my invention:

1. A talking machine motor having, in combination, a supporting frame, a vertical turn-table spindle mounted therein, a horizontal shaft removably and non-rotatably fixed in said frame, a gear wheel having a hub rotatable on said horizontal shaft, a worm on said spindle meshing with said gear wheel, a sleeve rotatably mounted on said horizontal shaft and detachably engaging the hub of said gear wheel so as to rotate the latter, a drum surrounding said sleeve, a spiral spring having its outer end secured to said drum and having its inner end secured to said sleeve, a bushing surrounding said horizontal shaft and rotatable on said shaft and in a bearing in the supporting frame, said bushing being detachably connected to said drum for rotating the latter, a winding shaft rotatably mounted on said frame, gears connecting said winding shaft and said bushing for rotating the latter, a ratchet wheel carried by said winding shaft, and a double oscillatory pawl mounted to rock on said horizontal fixed shaft and coöperating with said ratchet wheel.

2. A talking machine motor having, in combination, a frame, a turn-table spindle rotatably mounted therein and provided with a worm, a shaft removably and non-rotatably fixed in said frame, a gear wheel meshing with said worm and having a hub rotatable on said shaft, a sleeve rotatably surrounding said shaft, said sleeve and said hub having separable interlocking parts to provide a driving engagement therebetween, a drum surrounding said sleeve, a spiral spring having its ends attached to said drum and sleeve respectively, a bushing surrounding said shaft and rotatably mounted in a bearing in said frame, said bushing being detachably connected to said drum to drive said drum, a winding shaft mounted in said frame, gears connecting said winding shaft and said bushing for rotating the latter to wind up said spring, and a pawl-and-ratchet device to prevent reverse movement of said winding shaft.

3. A talking machine motor having, in combination, a frame, a turn-table spindle mounted therein, a shaft removably and non-rotatably fixed in said frame, a gear wheel rotatably mounted on said shaft and arranged to drive said spindle, a sleeve rotatably surrounding said shaft, said sleeve and gear having a separable interlocking lug and recess to provide driving engagement therebetween, a drum surrounding said sleeve, a spiral spring having its ends fixed respectively to said drum and sleeve, a second sleeve rotatably surrounding said shaft, said second sleeve and said drum having a separable interlocking lug and recess to provide a driving connection between the sleeve and drum, a second drum surrounding the second sleeve, a spiral spring having its ends fixed respectively to said second drum and second sleeve, a winding shaft having a gearing connection with the second drum to rotate it in one direction to wind up both of said springs, and means for preventing rotation of the drum in the opposite direction.

4. A talking machine motor having, in combination, a frame, a turn-table spindle rotatably mounted therein and provided with a worm, a shaft removably and non-rotatably fixed in said frame, a gear wheel meshing with said worm and rotatably mounted on said shaft, a sleeve rotatably surrounding said shaft alongside said gear wheel, said sleeve and said gear wheel having separable interlocking parts to provide a driving engagement therebetween, a drum surrounding said sleeve, a spiral spring having its ends attached to said drum and sleeve, respectively, a bushing surrounding said shaft and rotatably mounted in a bearing in said frame, said bushing being detachably connected to said drum, and means for rotating said bushing to wind up said spring.

5. A talking machine motor having, in combination, a frame, a shaft removably and non-rotatably fixed therein, a gear wheel, a sleeve, a drum and a bushing, all rotatably mounted on said shaft, said sleeve and gear being directly but separably connected together, a spiral spring having its ends attached respectively to said drum and said sleeve, the drum and sleeve being independently rotatable on the shaft, said bushing being directly but separably connected to said drum for rotating the latter, means for rotating said bushing to drive said drum and wind up said spring, and means for preventing reverse rotation of said drum.

6. A talking machine motor having, in combination, a removably mounted shaft and a plurality of spring units mounted side by side on said shaft separably connected together, each of said units comprising a drum, a central sleeve and a spiral spring having its ends attached respectively to said drum and sleeve, the drums, springs and sleeves of the different units being duplicates of each other, whereby any one of said parts is adapted for use either in a single-unit or plural-unit motor, and means arranged to be driven by said units and having a connection with one of them substantially identical with the connection between adjacent units.

7. A talking machine motor having, in combination, a supporting shaft and a plurality of duplicate spring units mounted side by side on said shaft, all of said units being interchangeable and each comprising a drum and a sleeve directly mounted on the shaft for independent rotation, and a spring having its ends attached respectively to said drum and sleeve, the drums, springs and sleeves of the several units being duplicates of each other and the sleeve of one unit being arranged to detachably interlock with the drum of the next unit to rotate together, means to receive power from the sleeve at one end of the series of units, and means for rotating the drum of the unit at the other end of the series for winding up all of said springs, the connections between the two last mentioned means and their adjacent units being substantially identical with the connection between the sleeve of one unit with the drum of another unit.

8. A talking machine motor having, in combination, a removably mounted supporting shaft, a plurality of spring units mounted on said shaft and separably connected together and each comprising an outer and an inner element connected by a spiral spring, the elements of the respective units being duplicates of each other, whereby any element may be used either in a single-unit or plural-unit motor, and means arranged to be driven by said units and having a connection with one of them substantially identical with the connection between adjacent units.

9. A talking machine motor having, in combination, a supporting shaft, a plurality of spring units mounted on said shaft and each comprising outer and inner elements independently rotatable and connected by a spiral spring, the elements of the respective units being duplicates of each other so that any element may be used either in a single-unit or plural-unit motor, the respective inner and outer elements of two adjacent units having a direct but separable engagement to rotate together, a gear wheel mounted on said shaft at one end of the series of units, said wheel being directly but separably engaged by the inner element of the last unit for rotating the gear wheel, a bushing mounted on said shaft at the opposite end of the series of units and directly but separably engaging the outer element of the first unit for rotating the latter to wind up the springs in all of the units, and means for rotating said bushing in the direction to wind said springs.

10. A talking machine motor having, in combination, a plurality of spring units located side by side, each of said units comprising an outer and inner element connected by a spiral spring, and all of the units being detachably connected together by means of a direct rigid engagement of the inner element of one unit with the outer element of the next adjacent unit, means to apply power to one of said elements of the first unit located at one end of the series, whereby all of the springs may be wound up, the non-corresponding element of the last unit at the opposite end of the series having a connection with the means to be driven substantially identical with the connection between the non-corresponding elements of adjacent units whereby to transmit the power of the springs to the desired end.

11. A talking machine motor having, in combination, a frame, a shaft removably and non-rotatably fixed therein, a series of spring units supported on said shaft and each comprising a drum and a sleeve directly mounted on said shaft for independent rotation and connected by a spiral spring, the drums, springs and sleeves of the respective units being duplicates of each other, each sleeve having one end shaped to detachably interlock with an adjacent part, the sleeve of one unit detachably interlocking with the drum of the next adjacent unit for rotating said drum, a gear wheel rotatably mounted on said shaft at one end of the series of said units, the sleeve of the unit at said end detachably interlocking with the hub of said gear wheel to drive the latter, means for rotating the drum of the unit at the opposite end of the series to wind up all of the springs, and means for preventing reverse rotation of said drum.

12. A talking machine motor having, in combination, a frame, a shaft removably and non-rotatably fixed therein, a series of spring units supported on said shaft and each comprising a drum and a sleeve directly mounted on said shaft for independent rotation and connected by a spiral spring, the drums, springs and sleeves of the respective units being duplicates of each other, each sleeve having one end shaped to detachably interlock with an adjacent part, the sleeve of one unit detachably interlocking with the drum of the next adjacent unit for rotating said drum, a gear wheel rotatably mounted on said shaft at one end of the series of said units, the sleeve of the unit at said end detachably interlocking with the hub of said gear wheel to drive the latter, a bushing rotatably surrounding said shaft and rotatably mounted in a bearing in said frame at the end of the series of units opposite to said gear wheel, said bushing having one end shaped to detachably interlock with the drum of the adjacent unit, means for rotating said bushing to drive the drum engaged thereby and wind up all of said springs, and means for preventing reverse rotation of said drum.

13. A spring motor having, in combination, a frame, a shaft having one end removably and non-rotatably fixed in said frame, a bushing in which the other end of said shaft lies, said bushing being rotatably mounted in said frame, a gear wheel rotatably mounted on said shaft, a sleeve rotatably mounted on said shaft alongside said gear wheel and directly but detachably engaging said wheel for rotating the latter, a drum rotatably mounted on said shaft for rotation independently of said sleeve, and a spiral spring having its ends attached respectively to said drum and sleeve, said bushing being arranged to rotate said drum to wind up said spring, and means for preventing rotation of the drum in the opposite direction.

14. A spring motor having, in combination, a frame, a shaft mounted in said frame, a driving sleeve rotatable on said shaft, a drum surrounding said shaft, a spiral spring having its ends attached respectively to said drum and sleeve, a winding shaft operatively connected to said drum for rotating the latter in one direction to wind up the spring, a ratchet wheel driven by said winding shaft but having a lost motion connection with its driver, and a double oscillatory pawl coöperating with said ratchet wheel and arranged to prevent reverse rotation of said drum.

15. A spring motor having, in combination, a shaft, a gear wheel rotatably mounted on said shaft, a rotary drum surrounding said shaft, a spring arranged to communicate motion from said drum to said gear wheel, means for rotating said drum to wind up said spring, a ratchet wheel rotatable with one element of said means but having a limited amount of rotary lost motion with respect to said element, and a pawl coöperating with said ratchet wheel to prevent reverse rotation of said drum.

16. A talking machine motor having, in combination, a turn-table spindle, a spiral spring and connected means for driving said spindle, means for winding up said spring, a ratchet wheel mounted on a rotary element included in said winding means, said ratchet wheel having a recess adjacent to its central portion, a projection carried by said element and lying in said recess and arranged to cause rotation of said ratchet wheel with said element, said recess allowing a limited amount of rotation of the ratchet wheel with respect to said element, and a pawl coöperating with said ratchet wheel and arranged to prevent reverse movement of said winding means.

17. A talking machine motor having, in combination, a frame, a turn-table spindle mounted therein, a shaft mounted in said frame and carrying spring means which is operatively connected to said spindle for driving the latter, a separate winding element, gears connecting said winding element to said spring means for winding up the spring, a ratchet wheel mounted on said winding element and having a recess adjacent to its center, a projection on said winding element occupying said recess, and a double pawl pivoted on said shaft and coöperating with said ratchet wheel.

18. A talking machine motor having, in combination, a frame comprising a horizontal attaching portion, a projecting U-shaped portion and a lug, a spring-driving unit having its axis mounted in said lug and in one arm of the U, the other arm of the U being located alongside of the said axis, a spindle rotatably mounted in bearings in said horizontal portion and in the cross-piece of the U and being operatively connected to said driving unit, and a governor shaft operatively connected to said spindle and mounted in bearings in the horizontal attaching portion and the cross-piece of the U.

19. A talking machine motor having, in combination, an attaching portion, a projecting lug and a projecting U-shaped portion, the arms of the U being attached to said attaching portion and the cross-piece of the U being spaced from the latter, a spring-driving unit having its axis mounted in said lug and in one arm of the U, the cross-piece of the U being curved and the other arm thereof being located alongside of the said axis, a spindle and a governor shaft mounted in bearings in said attaching portion and in said cross-piece of the U, said spindle and shaft being connected together, and the spindle being operatively connected to said spring-driving unit.

20. A talking machine motor having, in combination, a frame comprising an attaching portion and a projecting U-shaped portion with the arms of the U attached to said attaching portion and the cross-piece of the U spaced from the latter, a driving unit having its axis mounted in one arm of said U-shaped portion, the cross-piece of the U being curved and the other arm thereof being located alongside of said axis, and a turn-table spindle and governor shaft operatively connected to said driving unit and mounted in bearings in said attaching portion and said cross-piece of the U-shaped portion.

21. A talking machine motor having a frame comprising an attaching portion and a projecting U-shaped portion, the arms of the U being attached to said attaching portion and the cross-piece of the U being spaced from the latter, one of the arms of the U providing a bearing for the axis of a driving unit and the other arm being offset to lie at one side of the said axis, the cross-piece of the U being adapted to provide a bearing for the turn-table spindle.

In testimony whereof I have hereunto set my hand.

WILLIAM P. DUN LANY.